United States Patent [19]
Koenen et al.

[11] Patent Number: 5,946,189
[45] Date of Patent: Aug. 31, 1999

[54] PIVOTABLE SUPPORT AND HEAT SINK APPARATUS REMOVABLY CONNECTABLE WITHOUT TOOLS TO A COMPUTER PROCESSOR

[75] Inventors: David J. Koenen, Houston; Kenneth A. Jansen, Spring, both of Tex.

[73] Assignee: Compaq Computer Corporation, Houston, Tex.

[21] Appl. No.: 09/167,046

[22] Filed: Oct. 5, 1998

Related U.S. Application Data

[62] Division of application No. 08/839,066, Apr. 23, 1997, Pat. No. 5,886,872.

[51] Int. Cl.$^6$ .................................................. H05K 7/20
[52] U.S. Cl. ........................... 361/698; 165/80.3; 361/716
[58] Field of Search .................................. 165/80.3, 80.4, 165/185, 104.33; 439/485, 487; 363/141; 361/698, 699, 701–704, 707, 709–711, 715, 716, 717–719, 720, 724–726

[56] References Cited

U.S. PATENT DOCUMENTS

| | | |
|---|---|---|
| 3,571,663 | 3/1971 | Hungate . |
| 3,648,113 | 3/1972 | Rathjen . |
| 4,235,285 | 11/1980 | Johnson . |
| 4,977,444 | 12/1990 | Nakajima . |
| 5,245,527 | 9/1993 | Duff . |
| 5,251,096 | 10/1993 | Hosoi . |
| 5,552,961 | 9/1996 | Van Gaal . |
| 5,671,120 | 9/1997 | Kikinisi . |

*Primary Examiner*—Gerald Tolin
*Attorney, Agent, or Firm*—Konneker & Smith, P.C.

[57] ABSTRACT

A combination support and heat sink structure is mounted within a computer housing for pivotal movement between connected and disconnected positions and includes a pair of cooling plates, one air cooled and the other liquid cooled, carried in a spaced apart, parallel opposing relationship. The two cooling plates are movable toward and away from one another and a pair of manually operable spring clip members permit a processor card to be removably sandwiched and clamped between the cooling plates without the use of tools. When the structure is pivoted to its connected position a connection edge portion of the supported processor card is operatively inserted into an adjacent backplane connection socket, and when the structure is pivoted to its disconnected position the connection edge portion of the processor card is initially moved straight outwardly from the socket, and then pivoted with the structure to its disconnected position at which point the spring clips may be unfastened, without the use of tools, to permit the removal of the processor card from the support and heat sink structure.

16 Claims, 2 Drawing Sheets

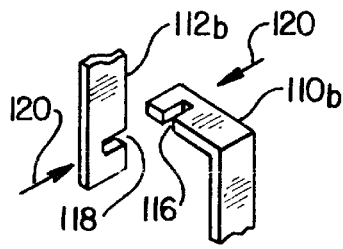
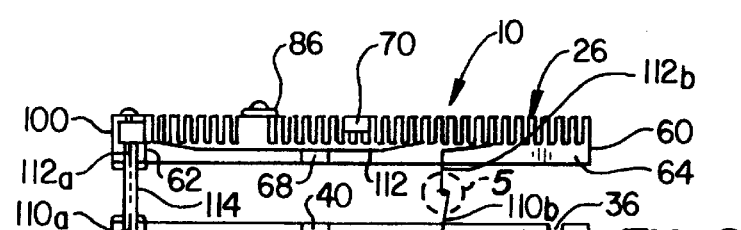
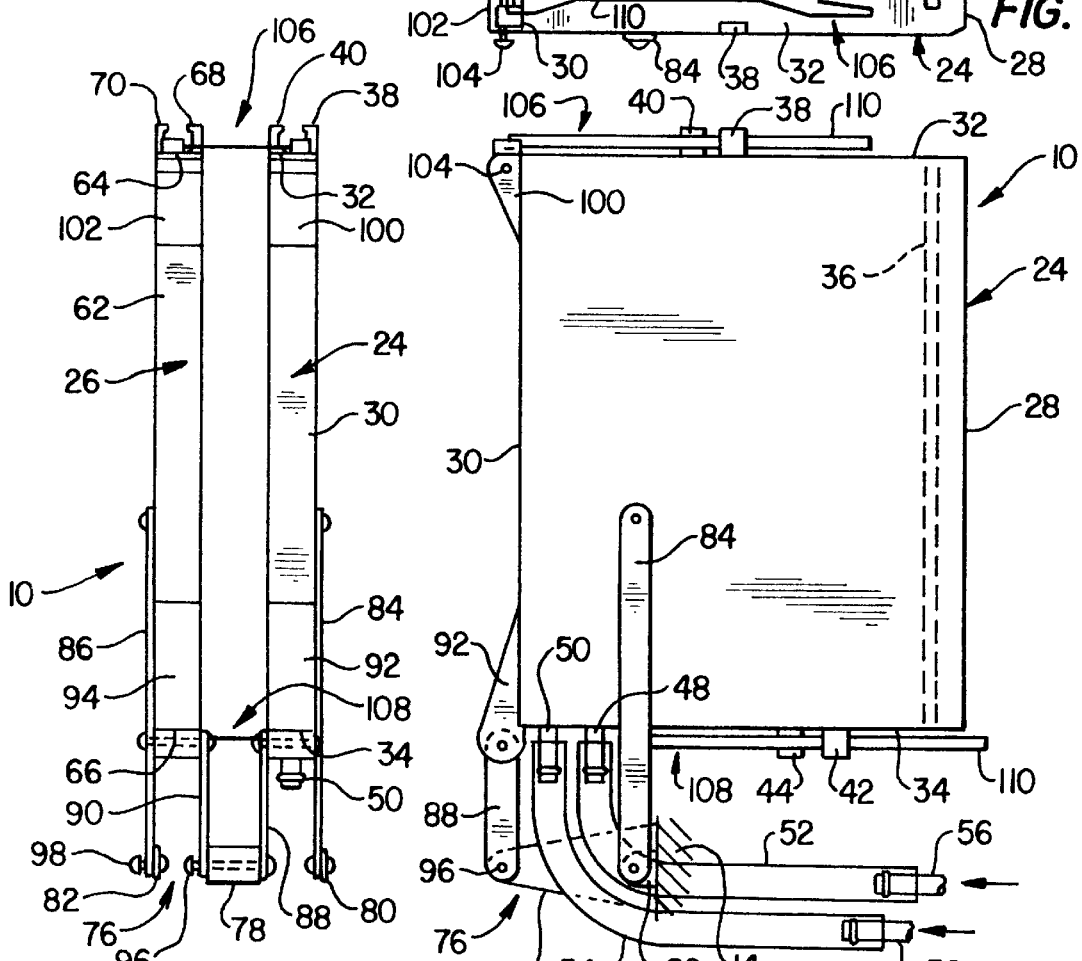

PIVOTABLE SUPPORT AND HEAT SINK APPARATUS REMOVABLY CONNECTABLE WITHOUT TOOLS TO A COMPUTER PROCESSOR

This is a division, of application Ser. No. 08/839,066, filed Apr. 23, 1997, such prior application being incorporated by reference herein in its entirety, now U.S. Pat. No. 5,886,872.

BACKGROUND OF THE INVENTION

1. Field of the Invention

The present invention generally relates to heat dissipation in electronic devices and, in a preferred embodiment thereof, more particularly relates to apparatus for dissipating heat from heat generating electronic components, such as high speed processors, in computers.

2. Description of Related Art

As computer processors are provided with higher and higher clock speeds, they generate correspondingly greater amounts of heat which must be efficiently dissipated by an appropriate cooling system to prevent performance degradation and/or processor damage. In addition to the processor, the cooling system must also cool the associated memory components and densely populated I/O cards. At frequencies of 100 MHz and higher, signal lengths from the processor, memory, and I/O bridges to the common memory controller are critical and dictate that the processor, memory components and I/O cards be positioned in close adjacency to the common memory controller.

This component proximity requirement, as a practical matter, dictates that the processor, memory components and I/O cards be positioned in a compact three dimensional relationship instead of being positioned in parallel in the same general plane as may be done with lower clock speed components. The requisite compact three dimensional arrangement for these related components precludes the traditional cooling approach of simply placing finned metal heat sinks on the processor and blowing air across the heat sinks and the processor-related memory and I/O card components since it is quite difficult to properly route cooling air through backplane boards, around corners, and through other tortuous flow paths unavoidably present in three dimensional component arrangements.

Another problem arising from this three dimensional/close proximity component arrangement requirement is that service and upgrade access to the components is made more difficult. For example, if screws or fasteners were required to attach heat sink apparatus to the processor, the time and cost of removal and installation of the processor would be undesirably increased. If the processor were to be liquid cooled, special tubing would be required. The disconnection and reconnection of coolant tubing could easily pose a major servicing problem, along with requiring special tools.

From the foregoing it can be seen that the use of modern high speed computer processors poses three design problems. Namely, the processor, memory components and I/O cards must be (1) physically close to the common memory controller, (2) cooled to prevent overheating, and (3) positioned for ease of repair and upgrading. It is accordingly an object of the present invention to provide processor cooling apparatus that addresses and solves or at least substantially reduces these three problems.

SUMMARY OF THE INVENTION

In carrying out principles of the present invention, in accordance with a preferred embodiment thereof, an electronic device representatively in the form of a computer is provided and comprises a housing; an electrical connector disposed in the housing; and a heat generating electronic component, representatively a processor, disposed in the housing and releasably connectable to the electrical connector.

To dissipate operating heat from the heat generating component, heat dissipation apparatus is provided and, from a broad perspective, comprises (1) a heat absorbing member; (2) a holding structure connected to the heat absorbing member and supporting the heat generating electronic component in a heat transfer relationship with the heat absorbing member for movement therewith; and (3) a linkage structure connected to the heat absorbing member and mounting it for manual movement between first and second limit positions in which the heat generating electronic component is respectively connected to and disconnected from the electrical connector.

According to a feature of the invention, the holding structure is manually operable, without tools, to releasably clamp the heat absorbing member against the heat generating electronic component, and the linkage structure is operative to connect the component to the electrical connector when the heat absorbing member is manually moved to its first limit position, and disconnect the component from the connector as the heat absorbing member is manually moved away from its first limit position.

According to another feature of the invention, the linkage structure is operative to support the heat absorbing member for a primarily pivotal movement between its first and second limit positions, and the heat absorbing member is a liquid cooled cold plate member having operatively connected thereto flexible liquid supply and return conduits. Because the linkage structure restrains the movement of the cold plate between the aforementioned first and second limit positions, manual disconnection of the component from the connector does not risk unintended separation of the flexible conduits from the cold plate and the resulting creation of fluid leakage within the housing.

While the linkage structure permits primarily pivotal motion of the heat absorbing member, it preferably creates essentially linear translational motion of the heat absorbing member toward and away from the connector as the member respectively approaches and initially moves away from the connector. In this manner, as the heat absorbing member is manually moved between its limit positions, the supported heat generating component is automatically provided with "straight in" and "straight out" connection and disconnection movements relative to its associated electrical connector.

In a preferred embodiment of the combination component support and heat absorbing apparatus of the present invention, the heat absorbing member is a first heat absorbing member, and the holding structure includes a second heat absorbing member and a clamping portion releasably clamping the heat generating component between the first and second heat absorbing members.

Representatively, the first heat absorbing member is a liquid cooled cold plate, the second heat absorbing member is a finned metal heat sink member adapted for air cooling, and the clamping portion is operative without tools and includes first and second releasably lockable spring clip structures interconnected between the two heat absorbing members.

According to another feature of the invention, the heat generating electronic component and one of the heat absorbing members have interlocking structures which prevent relative movement therebetween in the connection and disconnection directions of the supported heat generating electronic component.

The incorporation of the present invention's combination support and heat dissipating apparatus in a computer in operative association with its processor uniquely permits the processor, memory components and I/O cards to be (1) physically close to the common memory controller, (2) cooled to prevent overheating, and (3) positioned for ease of repair and upgrading due to the tool-less installation and removal access provided for the processor by the support and heat dissipating apparatus connected thereto.

BRIEF DESCRIPTION OF THE DRAWINGS

FIG. 1 is a top plan view of a specially designed pivotable computer processor support/heat sink structure embodying principles of the present invention;

FIG. 2 is a left end elevational view of the processor support/heat sink structure;

FIG. 3 is a right end elevational view of the processor support/heat sink structure;

FIG. 4 is a rear side elevational view of the processor support/heat sink structure;

FIG. 5 is an enlarged scale perspective detail view of the dashed circle area "5" in FIG. 2;

DETAILED DESCRIPTION

Figure 6:
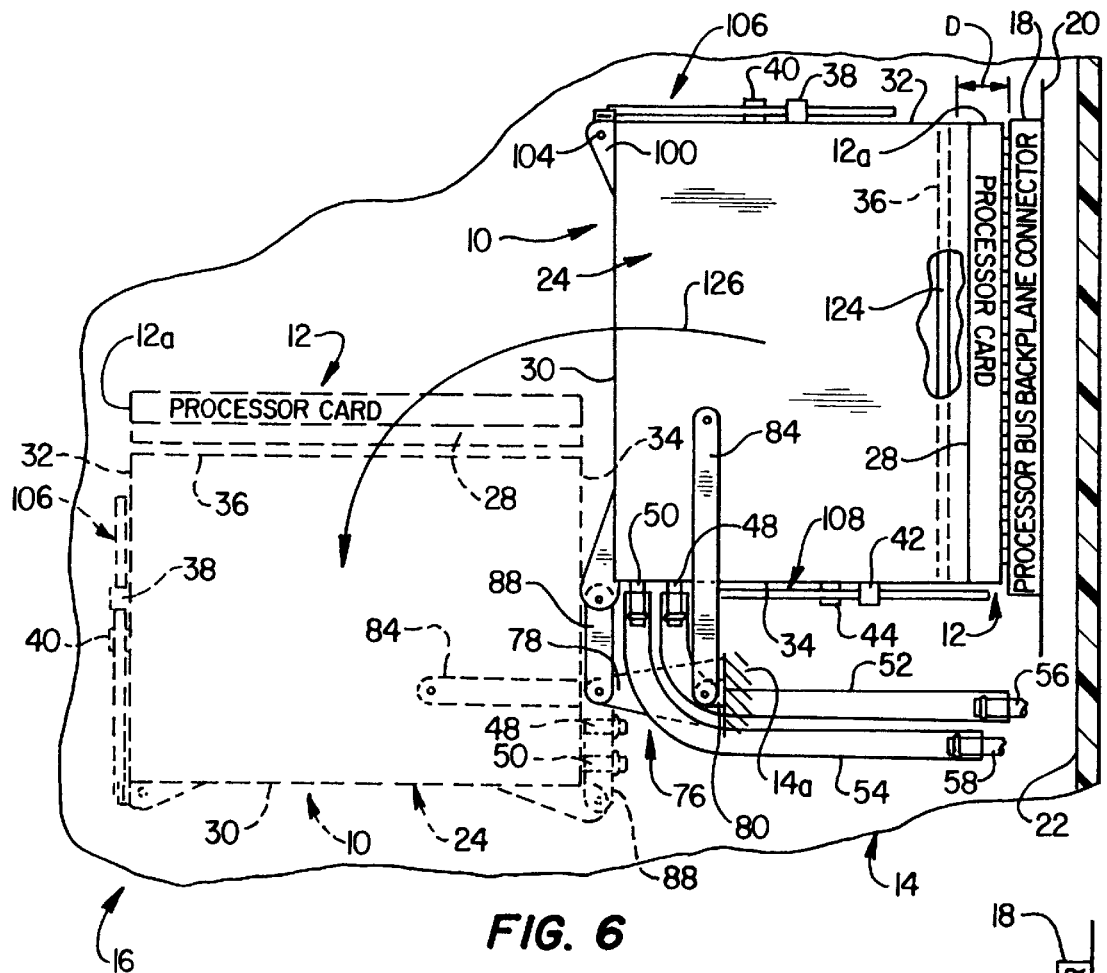
FIG. 6 is a top plan view of the support/heat sink structure installed in a portion of a representative computer housing and operatively connected to a processor card.

Illustrated in four orthographically projected views in FIGS. 1–4 is a specially designed combination support and heat sink apparatus 10 which embodies principles of the present invention. In a manner subsequently described herein with reference to FIGS. 6 and 7, the apparatus 10 is used to pivotally support, and dissipate operating heat from, a high speed processor card 12 disposed within the housing portion 14 of a computer 16 and removably connectable to a processor bus backplane connector socket 18 mounted on a printed circuit board 20 located within the housing 14, representatively adjacent an exterior wall 22 thereof.

Referring initially to FIGS. 1–4, the support/heat sink apparatus 10 has a top side portion defined by a generally rectangular liquid cooled cold plate member 24, and a bottom side portion defined by a finned, air cooled metal heat plate member 26 disposed in a spaced, parallel opposing relationship with the cold plate member 24.

The top cold plate 24 has opposite front and rear sides 28 and 30; opposite left and right ends 32 and 34; an elongated groove 36 formed in its inner side surface inwardly adjacent and parallel to its front side 28; upper and lower spring clip projections 38 and 40 formed on its left end 32; upper and lower spring clip projections 42 and 44 formed on its right end 34; a serpentined interior cooling liquid flow passage 46 (see FIG. 7); outwardly projecting liquid supply and return hose fittings 48 and 50 positioned on a rear portion of the right end 34 and operatively communicated with the interior flow passage 46; and a pair of flexible liquid supply and return conduits 52 and 54 interconnected between the fittings 48,50 and a pair of rigid liquid supply and return pipes 56 and 58 disposed within the computer housing 14 (see FIG. 6).

The finned bottom plate member 26 has opposite front and rear sides 60 and 62; opposite left and right ends 64 and 66; upper and lower spring clip projections 68 and 70 formed on its left end 64; and upper and lower spring clip projections 72 and 74 formed on its right end 66.

A specially designed linkage structure 76 supports the top and bottom heat absorbing plate members 24,26 on a schematically depicted portion 14a of the housing 14 for pivotal and translational movement relative to the housing 14, and the backplane socket 18, between a solid line connected position shown in FIG. 6, and a dotted line disconnected position also shown in FIG. 6, as later described herein.

The linkage structure 76 includes a main mounting block 78 secured to the housing portion 14a, and a pair of upper and lower mounting tabs 80 and 82 positioned above and below the main mounting block 78, adjacent its inner or right end, and also secured to the housing portion 14a. An elongated upper primary linkage bar 84 is pivotally connected at one end to the upper side of the upper plate 24, and pivotally connected at its opposite end to the upper mounting tab 80, and an elongated lower primary linkage bar 86 is pivotally connected at one end to the underside of the lower plate 26, and pivotally connected at its other end to the lower mounting tab 82.

Linkage structure 76 also includes upper and lower secondary linkage bars 88 and 90, each of which is shorter than the primary linkage bars 84 and 86. Upper secondary linkage bar 88 is pivotally connected at one end to a mounting boss 92 projecting outwardly from a right rear corner portion of the upper plate 24, and is pivotally connected at its other end to the top side of an outer or left end portion of the main mounting block 78. Lower secondary linkage bar 90 is pivotally connected at one end to a mounting boss 94 projecting outwardly from a right rear corner portion of the lower plate 26, and is pivotally connected at its other end to the bottom side of an outer or left end portion of the main mounting block 78.

As best illustrated in FIGS. 3 and 4, ends of the secondary linkage bars 88 and 90, and an end of the lower primary linkage bar 86, are respectively pivoted to the outer end of the main mounting block 78 and the lower mounting tab 82 by loosely fitted pivot pins 96 and 98. In a similar fashion, upper and lower mounting bosses 100 and 102, respectively projecting outwardly from left rear corner portions of the upper and lower plates 24 and 26, are joined by a loose fitting pin member 104. In a manner subsequently described, the processor card 12 (see FIGS. 6 and 7) is supported by the apparatus 10 by sandwiching the card 12 between the upper and lower plates 24,26 and then clamping the plates 24,26 against the top and bottom sides of the sandwiched card in a heat absorbing relationship therewith. The loosely fitted pins 96,98,104 permit the plates to be moved from this clamped relationship slightly away from one another to facilitate the removal of the processor card 12 from between the upper and lower plates 24 and 26.

The processor card 12 may be held in this clamped, sandwiched orientation between the upper and lower plates 24 and 26 by means of two spring clip structures 106,108 respectively positioned outwardly of the left and right ends of the upper and lower plates 24,26.

Each of the spring clip structures 106,108 includes upper and lower elongated metal spring plate members 110,112 shaped as indicated and having transverse inner end portions 110a,112a and transverse outer end portions 112a,112b.

As illustrated in FIG. 2, the facing inner spring member end portions 110a,112a of the spring members 110,112 of the left spring clip structure 106 are received in a connecting member 114 extending between the upper and lower plates 24,26, with the upper spring member 110 extending between the upper and lower spring clip projections 38 and 40, and the lower spring member 112 extending between the upper and lower spring clip projections 68 and 70. As illustrated in FIG. 5, the outer spring end portions 110*b*,112*b* are releasably connectable, to place the spring structure 106 in its FIG. 2 clamping orientation by interlocking two facing side edge recesses 116 and 118, which are respectively formed in the spring member outer end portions 110*b* and 112*b*, as indicated by the arrows 120 in FIG. 5.

The interlocking of these recesses 116,118 causes the upper and lower spring members 110,112 of the left spring clip structure 106 to bear inwardly against the projections 40 and 68 to exert a resilient inward clamping force on left end portions of the upper and lower plates 24 and 26. By simply separating the spring end portions 110*b*,112*b* and then manually pushing the separated end portions 110*b*,112*b* apart in a manner causing the upper and lower spring members 110,112 outwardly against the projections 38 and 80, an unclamping force (tending to move the upper and lower plates 24,26 further apart from one another) can be exerted on the upper and lower plates 24 and 26.

As illustrated in FIG. 3, the right spring clip structure 108 is identical in configuration and operation to the left spring clip structure 106, but is forwardly offset from the left spring clip structure 106. The inner spring member ends 110*a*,112*b* of the right spring clip structure 108 are received in a connector member 122 extending between the upper and lower plates 24 and 26, the upper and lower spring members 110,112 of the right spring clip structure 108 respectively extend between the projection pairs 42,44 and 72,74, and the outer ends 110*b*,112*b* of the right spring clip structure spring members 110,112 being releasably interlockable as shown in FIG. 5.

Figure 7:
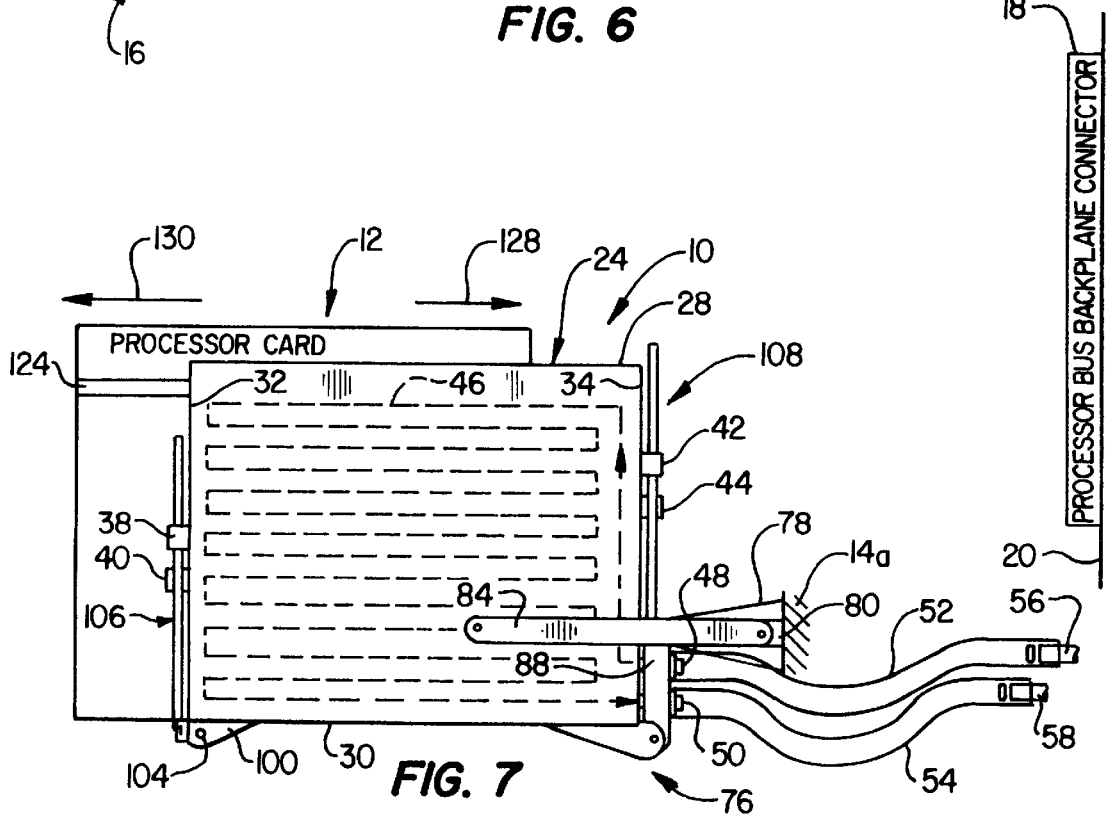
FIG. 7 is a top plan view of the support/heat sink structure pivoted to its disconnected/removal position permitting the indicated removal of the processor card.

Turning now to FIGS. 6 and 7, the operation of the support/heat sink apparatus 10 will now be described. The representative processor card 12 has a rectangular shape with a front connector edge portion 12*a* configured to be matingly received in the backplane connector socket 18, and a raised rib portion 124 formed on its top side and extending parallel to and inwardly adjacent the connector edge portion 12*a*.

As can be seen in FIG. 6, the linkage structure 76 supports the upper and lower heat transfer plates 24 and 26 for pivotal movement within the computer housing 14 between (1) a solid line connected position in which the front sides 28,60 of the plates 24,26 face the backplane connector socket 18 in an adjacent, parallel relationship therewith, and (2) a dotted line disconnected position (also shown in solid line fashion in FIG. 7) in which the upper and lower plates 24,26 have been pivoted in a counterclockwise direction (as indicated by the arrow 126 in FIG. 6) approximately 90 degrees away from their connected position.

While the movement of the plates 24,26 between these two limit positions is, in general, a pivotal motion, the linkage structure 76 operates to provide the plates 24,26 with an essentially pure translational motion transverse to the length of the socket 18, through the relatively small distance D, toward and away from the backplane connector socket 18 as the plates 24,26 respectively approach the socket 18 and are initially moved away therefrom.

With the spring clip structures 106 and 108 unlatched, and the upper and lower heat transfer plates 24 and 26 moved slightly away from their clamping positions shown in FIGS. 2–4, the processor card 12 is slid rightwardly into the space between the separated plates 24,26 (as indicated by the arrow 128 in FIG. 7) in a manner causing the processor card top side rib 124 to be slidingly received in the corresponding groove 36 in the underside of the top plate 24 (see FIG. 6).

When the processor card 12 is fully inserted into the space between the upper and lower plates 24,26 the spring clip structures 106 and 108 are manually closed, by pressing the upper and lower spring member pairs 110,112 of each spring clip structure toward one another and then interlocking the free spring end portions 110*b*,112*b* as indicated in FIG. 5. Closing of the spring clip structures 106,108 in this manner causes the spring members 110,112 of clip structure 106 to forcibly engage the plate projections 40 and 68 (see FIG. 2), and the spring members 110,112 of clip structure 108 to forcibly engage the plate projections 44 and 72 (see FIG. 3), thereby releasably clamping the upper and lower heat transfer plates 24,26 respectively to the top and bottom sides of the inserted processor card 12. The interlock between the processor card rib 124 and the upper plate groove 36 which receives it prevents relative movement between the processor card 12 and the plates 24,26 in front-to-rear directions.

As illustrated in FIG. 6, when the processor card 12 is operatively clamped between the upper and lower heat transfer plates 24,26 a front connector edge portion 12*a* projects outwardly beyond the front sides 28,60 of the upper and lower plates 24 and 26, the connector edge portion 12*a* being removably insertable into the backplane connector socket 18 to electrically couple the processor card 12 thereto.

After the processor card 12 is operatively clamped between the upper and lower heat transfer plates 24 and 26, and the spring clip structures 106,108 are manually closed, the plates 24,26 are manually pivoted about the linkage structure 76 from their FIG. 6 dotted line disconnected position to their FIG. 6 solid line connected position. As the plates 24,26 are manually pivoted toward their connected position, and the connector edge portion 12*a* of the processor card 12 approaches the backplane socket connector 18, the linkage 76 automatically converts the pivoting motion of the plates 24,26 to an essentially linear, forwardly directed motion, through the terminal distance D, to provide the connector edge portion 12*a* with a "straight-in" coupling motion into the interior of the socket 18.

Later, when it is desired to access the processor card 12 for removal, the plates 24,26 are manually grasped and rearwardly pulled. In response to this rearward pull on the plates 24 and 26, which is transmitted to the processor card 12 via the interlock between the card rib 124 and the upper plate groove 36, the processor card connector edge portion 12*a* is rearwardly pulled out of the socket 18, through the linear travel distance D, and the processor card 12 is then pivoted with the plates 24,26 to their dotted line disconnected position as indicated by the arrow 126 in FIG. 6. As can best be seen in FIG. 7, like the connected position of the plates 24 and 26, this disconnected position is a travel limit position, the linkage 76 preventing any appreciable further pivoting of the plates 24,26 in a counterclockwise direction as viewed in FIG. 7.

With the plates 24,26 pivoted to their disconnected limit position shown in FIG. 7, the processor card 12 can be removed from the support/heat sink apparatus 10 simply by opening the spring clip structures 106 and 108, manually pushing the spring member pairs 110,112 of spring clip structures 106,108 apart from one another and into engagement with their associated projection pairs 38,70 (see FIG.

2) and 42,74 (see FIG. 3) to move the plates 24,26 away from one another, and then sliding the processor card 12 leftwardly out of the space between the plates 24,26 as indicated by the arrow 130 in FIG. 7.

It is important to note that the loading of the processor card 12 into the apparatus 10, the connection of the processor card 12 to the backplane socket 18, the removal of the processor card 12 from the backplane socket 18, and the removal of the processor card 12 from the apparatus 10 may all be achieved easily and quickly without the use of any tools whatsoever, and without the necessity of disconnecting the flexible supply and return conduit 52,54 from the upper plate 24. Additionally, since the linkage 76 limits the total travel of the upper and lower heat transfer plates 24 and 26, the conduits 52,54 cannot be pulled apart from either the top plate 24 or their associated rigid pipes 56,58 by operative movement of the apparatus 10 relative to the computer housing 14—the flexible conduits 52,54 are merely bent between their indicated FIG. 6 and FIG. 7 positions.

The primarily pivotal movement of the plates 24,26 between their indicated connected and disconnected positions is advantageous due to resulting ability to avoid having to provide the flexible liquid supply and return conduits 52 and 54 with large service loop portions that might be required if the overall limit position-to-limit position movement of the plates 24,26 was of another type. However, if desired, the linkage 76 could be modified to provide another type of limited movement of the plates 24,26 relative to the housing 14—for example, a purely linear front-to-rear movement toward and away from the backplane socket connector 18.

The particular processor card 12 representatively illustrated generates considerably more operating heat from its top side than its bottom side. Thus, the more efficient liquid cooled cold plate 24 is clamped to the top side of the processor card 12, with the finned, air coolable plate 26 being sufficient to absorb and dissipate the lesser amount of operating heat generated from the bottom side of the processor card 12.

However, as will be readily appreciated by those of skill in this particular art, heat generating electronic components other than processors may be used in conjunction with the support and heat sink apparatus 10, and other combinations of heat sink members may be utilized if desired. For example, liquid cooled heat sink members or air cooled heat sink members may be utilized on both sides of the particular heat generating component, or only one heat sink member may be used, with a suitable support structure being used on the other side of the heat generating component to facilitate the operative clamping of the single active heat sink member to the heat generating component.

The foregoing detailed description is to be clearly understood as being given by way of illustration and example only, the spirit and scope of the present invention being limited solely by the appended claims.

What is claimed is:

1. Apparatus for dissipating heat, comprising:
   a heat absorbing member;
   a holding structure carried by said heat absorbing member and operative to secure it to a heat generating component to receive heat therefrom; and
   an articulated linkage structure having pluralities of segments and pivot axes, a first portion secured to said heat absorbing member, and a second portion spaced apart from said first portion and being securable to a support structure, said articulated linkage structure having rotational and translational movement of said first portion thereof relative to said second portion thereof between first and second limit positions.

2. The apparatus of claim 1 wherein said heat absorbing member is a liquid cooled cold plate member.

3. The apparatus of claim 2 further comprising flexible liquid supply and return conduits operatively connected to said liquid cooled cold plate member.

4. The apparatus of claim 1 wherein said heat absorbing member is a finned metal heat sink member.

5. The apparatus of claim 1 wherein said articulated structure permits a generally pivotal movement of said heat absorbing member relative to said second portion of said articulated linkage structure between said first and second limit positions.

6. The apparatus of claim 5 wherein said generally pivotal movement includes a substantially linear translational movement portion relative to said second portion of said articulated linkage structure as said heat absorbing member approaches said first limit position, and a substantially linear translational movement portion relative to said second portion of said articulated linkage structure as said heat absorbing member begins to leave said first limit position.

7. Apparatus for dissipating heat, comprising:
   a first heat absorbing member;
   a holding structure carried by said first heat absorbing member and operative to secure it to a heat generating component to receive heat therefrom; and
   an articulated linkage structure having pluralities of segments and pivot axes, a first portion secured to said heat absorbing member, and a second portion spaced apart from said first portion and being securable to a support structure,
   said holding structure including a second heat absorbing member movable toward and away from said first heat absorbing member and a clamping portion operative to move said second heat absorbing member toward said first absorbing member to thereby releasably clamp the heat generating component between said first and second heat absorbing members.

8. The apparatus of claim 7 wherein said clamping portion includes first and second releasably lockable spring clip structures interconnected between said first and second heat absorbing members.

9. The apparatus of claim 8 wherein:
   said first and second heat absorbing members have first and second projections formed thereon, and
   said first and second spring clip structures have separate spring portions which may be manually moved toward one another in a manner bringing them into contact with said first projections and moving said first and second heat absorbing members toward one another, and manually moved away from one another in a manner bringing them into contact with said second projections and moving said first and second heat absorbing members away from one another.

10. The apparatus of claim 7 wherein at least one of said first and second heat absorbing members is a liquid cooled cold plate member.

11. The apparatus of claim 10 wherein each liquid cooled cold plate member has flexible liquid supply and return conduits operatively connected thereto.

12. The apparatus of claim 7 wherein at least one of said first and second heat absorbing members is a finned metal heat sink member.

13. The apparatus of claim 7 wherein:

said first heat absorbing member is a liquid cooled cold plate member, and said second heat absorbing member is a finned metal heat sink member.

14. Apparatus for supporting an electronic component for selective movement toward and away from an electrical connector to selectively couple and uncouple a connector portion of the electronic component to and from the electrical connector, said apparatus comprising:

a first member;

a holding structure carried by said first member and operative to secure the electrical component thereto; and an articulated linkage structure having pluralities of segments and pivot axes, a first portion secured to said first member, and a second portion spaced apart from said first portion and being securable to a support structure, said articulated linkage structure having rotational and translational movement of said first portion thereof relative to said second portion thereof between first and second limit positions.

15. The apparatus of claim 14 wherein said articulated linkage structure permits a generally pivotal movement of said first member relative to said second portion of said articulated linkage structure between said first and second limit positions.

16. The apparatus of claim 15 wherein said generally pivotal movement includes a substantially linear translational movement portion relative to said second portion of said articulated linkage structure as said first member approaches said first limit position, and a substantially linear translational movement portion relative to said second portion of said articulated linkage structure as said first member begins to leave said first limit position.

* * * * *